Jan. 15, 1963
C. FRANK
3,073,370
WHEEL TRACTION DEVICE
Filed Feb. 6, 1962
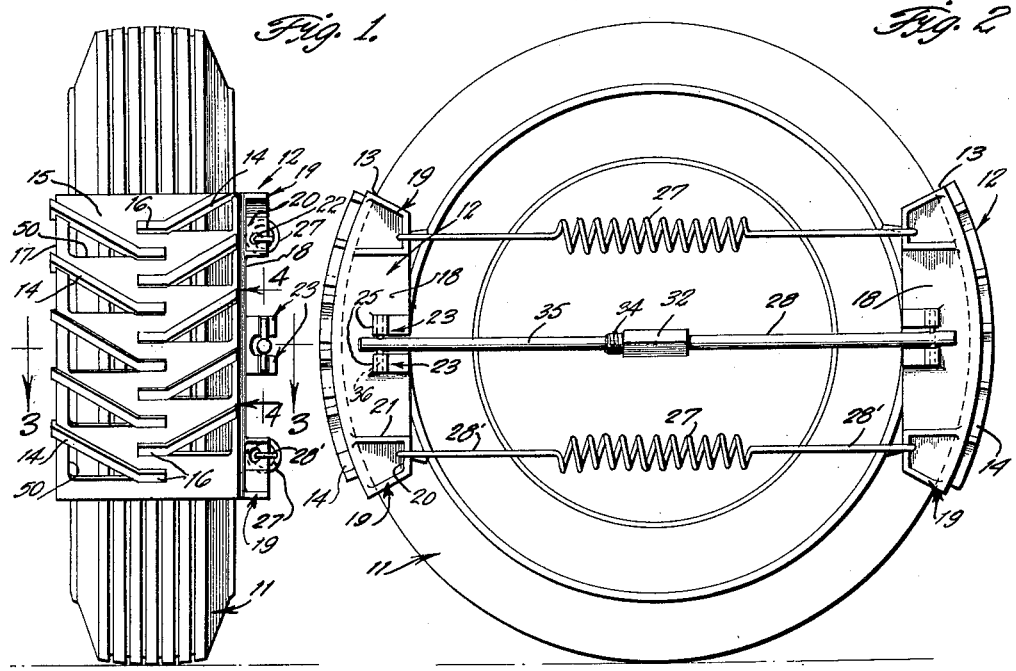
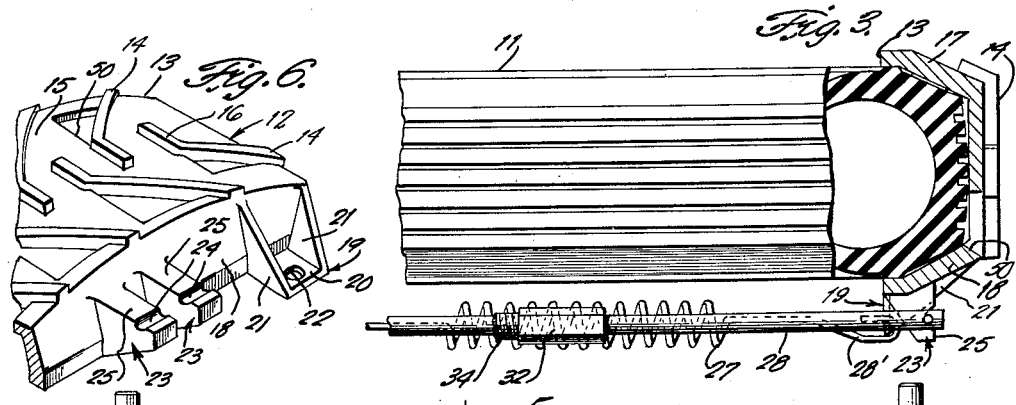
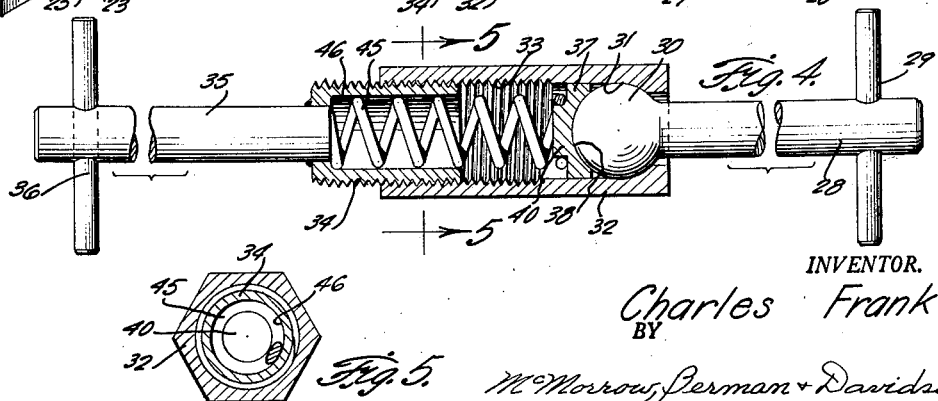
INVENTOR.
Charles Frank
BY
McMorrow, Berman + Davidson
ATTORNEYS United States Patent Office 3,073,370
Patented Jan. 15, 1963

3,073,370
WHEEL TRACTION DEVICE
Charles Frank, 436 New Lots Ave., Brooklyn 7, N.Y.
Filed Feb. 6, 1962, Ser. No. 171,374
4 Claims. (Cl. 152—218)

This invention relates to anti-skid attachments for vehicle wheels, and more particularly to a traction device suitable for attachment to a resilient vehicle tire.

A main object of the invention is to provide a novel and improved traction attachment for a resilient vehicle tire, said attachment being simple in construction, being easy to mount on a tire, and being provided with improved means for tightening same after such mounting so that the attachment will remain secured to the tire until it is desired to remove same.

A further object of the invention is to provide an improved traction attachment for a resilient vehicle tire, said attachment involving relatively inexpensive components, being rugged in construction, being easy to mount and to dismount from a tire, and being arranged so that it will retain a tight grip on the tire so as to efficiently transmit traction thereto.

Further objects and advantages of the invention will become apparent from the following description and claims, and from the accompanying drawings, wherein:

FIGURE 1 is a front elevational view of a pneumatic vehicle tire provided with an improved traction attachment according to the present invention.

FIGURE 2 is a side elevational view of the tire of FIGURE 1 with the traction attachment mounted thereon.

FIGURE 3 is a fragmentary horizontal cross sectional view, partly in plan, taken substantially on the line 3—3 of FIGURE 1.

FIGURE 4 is an enlarged vertical cross sectional view taken substantially on the line 4—4 of FIGURE 1.

FIGURE 5 is a vertical cross sectional view taken on the line 5—5 of FIGURE 4.

FIGURE 6 is a fragmentary perspective view of a portion of one of the rigid tread-engaging members employed in the traction attachment of FIGURES 1, 2 and 3.

Referring to the drawings, 11 designates a conventional motor vehicle tire, and generally designated at 12 is an improved traction attachment constructed in accordance with the present invention. The traction attachment 12 comprises a pair of arcuate, rigid, tread-engaging members 13, 13, said members being channel-shaped in transverse cross section and being engageable on diametrically opposite portions of the tire 11, the members 13 being formed on their arcuate outer surfaces with integral traction lugs 14 arranged preferably in the pattern illustrated in FIGURES 1 and 6. Thus, the lugs 14 may comprise respective parallel inclined ribs extending downwardly and inwardly from the side marginal portions of the outer wall 15 of each member 13, the inclined ribs 14 terminating in transversely extending short inner end portions 16. The lugs on the opposite sides of the member 15 are staggered relative to each other, as shown in FIGURE 1, the transversely extending short end portions 16 being arranged parallel to each other and in radially spaced sequence along the central portion of the member 15. The inclined ribs 14 extend parallel to each other, as previously mentioned, on the opposite side portions of the members 15 and are staggered with respect to each other on said opposite side portions, as is clearly shown in FIGURE 1. As shown in FIGURES 1 and 6, the arcuate outer wall of each tread member 13 is further formed forwardly adjacent each inclined lug 14 with a relatively shallow triangular recess 50, which provides clearance for and which substantially increases the gripping effect of the inclined portion of each lug 14.

Each tread-engaging member 13 is provided with an inner side wall 17 and an outer side wall 18. The outer side wall is formed integrally at its opposite end portions with respective cup-shaped projections 19, each projection comprising a centrally apertured bottom wall 20 and triangular side walls 21, 21, the bottom wall 20 extending substantially perpendicular to the associated side wall 18 of the tread-engaging member 13. As shown in FIGURE 6, each bottom wall 20 is provided with a central aperture 22.

The side wall 18 of each member 13 is integrally formed midway between the cup-like projections 19, 19 thereof with the spaced parallel lugs 23, 23 extending substantially perpendicular to the associated side wall 18, the top edges of said lugs, as viewed in FIGURE 6, being formed with the aligned, arcuately curved grooves 24, 24. The top edges 25 of the lugs 23, 23 extend substantially perpendicular to the associated wall 18, as shown in FIGURE 3.

The outer walls 15 of the tread-engaging members 13 are arcuately contoured to closely fit onto the tread surfaces of a tire 11 in the manner illustrated in FIGURE 2. Thus, the members 13, 13 are arranged diametrically opposite each other on the tread portion of the tire 11 and are secured together with sufficient force exerted therebetween to hold them securely on the periphery of the tire while it is rolling.

Designated respectively at 27, 27 are coiled springs provided with the respective opposite hooked end portions 28', 28', said end portions being engageable with the apertures 22 of the cup-shaped projections 19 at the opposite ends of the side walls 18 of the respective tread-engaging members 13, 13, in the manner clearly illustrated in FIGURE 2. Designated at 28 is a first rod member provided at one end with a transversely extending anchoring pin 29, said anchoring pin projecting on opposite sides of the rod member and being engageable in the grooves 24, 24 of the spaced lugs 23, 23 on the side wall of the tread-engaging member 13 at one side of the tire, as shown in FIGURE 2. The rod member 28 is receivable between the lugs 23, 23 with the respective end portions of the pin 29 associated therewith received in the grooves 24, 24. The rod member 28 is formed at its inner end with a spherical enlarged ball 30 which is received in the annular, spherically rounded seat 31 formed internally in a sleeve member 32, said sleeve member being provided with a non-circular external contour, for example, being formed with a hexagonal external contour, as shown in FIGURE 5. The sleeve member 32 is provided with the internal threads 33, and threadedly engaged therewith is an externally threaded cup member 34 rigidly secured to the inner end of a second rod member 35, said second rod member being provided at its outer end with a transversely extending anchoring pin 36 whose opposite end portions are engageable in the aligned grooves 24, 24 of the lugs 23 on the side wall of the tread-engaging member 13 at the portion of the tire diametrically opposite the first mentioned tread member 13, namely, the one engaged by the rod member 28.

As shown in FIGURE 4, a generally circular follower member 37 is slidably disposed inside the sleeve member 32 adjacent the ball 30, said follower member being formed with a spherically contoured recess 38 conforming with the contour of the ball member 30. The follower member 37 is formed on its opposite surface with the central stud element 40 which is received in the end of a coiled spring 45, the opposite end portion of the coiled spring being disposed in the cup member and bearing against the end wall of the cylindrical cavity 46 of said cup member. The spring 45 is of substantial strength and provides a bearing force against the follower member 37 which holds it firmly against the ball member 30, developing a reaction which pulls the cup member 34 outwardly relative to the threads 33 and thus provides a frictional binding force between said threads which prevents free rotation of the sleeve member 32.

In mounting the attachment on a tire 11, the springs 27, 27 are first engaged with the apertured element 20 and the attachment is slipped onto the tire, the springs being yieldable sufficiently to allow the members 13, 13 to be engaged on diametrically opposite portions of the periphery of the tire and being sufficiently strong to hold said tread members 13, 13 on said opposite portions. The sleeve member 32 is adjusted so that sufficient spacing exists between the pins 29 and 36 to allow said pins to pass over the edges 25 of the respective pairs of lugs 23, 23 on the side walls 18 of the tread members 13, 13, with the rod members 28 and 35 received between said pairs of lugs. The sleeve member 32 is then rotated to move the cup-shaped member 34 inwardly, whereby the distance between the pin members 29 and 36 is reduced, causing the pin members to seat in the grooves 24, 24 on the lugs 25, 25 on each side wall 18, and with continued rotation of the sleeve member 32 a substantial tension is developed in the rod members 28 and 35, causing the members 13, 13 to tightly engage against the diametrically opposite tread portions of the tire 11. By sufficiently tightening the sleeve member 32, the binding force on the tread-engaging members 13, 13 is sufficient to hold said members 13 on the diametrically opposite portions of the tire under the driving conditions for which the attachment is to be employed, for example, for heavy snow, ice, mud, or similar emergency conditions. Due to the tight frictional engagement of the members 13 on the diametrically opposite portions of the tire, traction will be efficiently and positively transmitted from the members 13 to the tire.

As will be readily apparent, if so desired, the springs 27, 27 may be removed after the sleeve member 32 has been tightened in the manner above described, since the tension developed in the rod members 28 and 35 will be sufficient to retain the membrs 13, 13 in operative engagement with the diametrically opposite portions of the tire 11.

In dismounting the attachment, it is merely necessary to loosen the sleeve member 32, namely, to rotate said sleeve member in a direction to cause the cup member 34 to become extended from the sleeve member, which increases the distance between the pin elements 29, 36, thus enabling said pin elements to become disengaged from their associated pairs of grooves 24, 24. When the rod members 35, 28 have been sufficiently extended relative to each other, the traction shoes 13, 13 will freely drop off the tire.

As an alternative, the springs 27, 27 may be employed in dismounting the shoe members 13, 13, the rod members 35, 28 being first unfastened from the members 13, 13 in the manner above described, after which, the upper spring 27 may be unfastened, allowing the shoe members to drop down onto the ground. After the traction members 13, 13 have dropped to the ground, the ends of the lowermost spring 27 may be disengaged therefrom, allowing the parts to be removed for storage.

As above mentioned, the springs 27, 27 may be retained in the positions thereof shown in FIGURE 2 during the use of the attachment, or, alternatively, said springs 27, 27 may be removed from the traction shoe elements 13, 13, and said shoe elements will be retained on the tire merely by the tension developed in the rod members 28 and 35 by the cooperating cup member 34 and sleeve member 32.

It will be noted that the sleeve member 32 is rotatable relative to the rod member 28, because of the free permissive rotation of ball element 30 relative to the sleeve member 32, so that the rod members 35 and 28 need not be in absolutely perfect alignment in order to clamp the traction shoe members 13, 13 into firm and secure frictional engagement with the opposite portions of the tread surface of the tire 11 when the sleeve member 32 is tightened.

Any suitable tool may be employed to rotate the sleeve member 32, for example, an open end wrench, or similar implement.

While a specific embodiment of an improved traction attachment for a resilient vehicle tire has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A traction attachment for a resilient vehicle tire comprising a pair of arcuate, rigid tread-engaging members, said members being channel-shaped in transverse cross section and being adapted to engage on opposite portions of a vehicle tire, said members being formed with integral traction lugs on their outer surfaces, respective inwardly extending rod members detachably connected to the tread-engaging members, ball element on the inner end of one of the rod members, a sleeve member having an annular spherical ball seat in one end receiving and rotatably engaged with said ball element, and means connecting the other rod member to the other end of the sleeve member.

2. A traction attachment for a resilient vehicle tire comprising a pair of arcuate, rigid tread-engaging members, said members being channel-shaped in transverse cross section and being adapted to engage on opposite portions of a vehicle tire, said members being formed with integral traction lugs on their outer surfaces, respective inwardly extending rod members detachably connected to the tread-engaging members, a ball element on the inner end of one of the rod members, an internally threaded sleeve member having an annular spherical ball seat in one end receiving and rotatably engaged with said ball element, an externally threaded member on the inner end of the other rod member threadedly engaged in said sleeve member, and a coiled spring in said sleeve member bearing between said ball element and said externally threaded member and exerting longitudinal holding force between the internal threads of the sleeve member and the threads of said externally threaded member.

3. A traction attachment for a resilient vehicle tire comprising a pair of arcuate, rigid tread-engaging members, said members being channel-shaped in transverse cross section and being adapted to engage on opposite portions of a vehicle tire, said members being formed with integral traction lugs on their outer surfaces, respective inwardly extending rod members detachably connected to the tread-engaging members, a ball element on the inner end of one of the rod members, an internally threaded sleeve member having an annular spherical ball seat at one end receiving and rotatably engaged with said ball element, an externally threaded cup member on the inner end of the other rod member threadedly engaged in said sleeve member, a spherically recessed follower member in said sleeve member receiving said ball element, and a coiled spring in said sleeve member bearing between said cup and said follower member and exerting longitudinal holding force between the internal threads of the sleeve member and the threads of said cup member.

4. A traction attachment for a resilient vehicle tire comprising a pair of arcuate, rigid tread-engaging members, said members being channel-shaped in transverse cross section and being adapted to engage on opposite portions of a vehicle tire, said members being formed with integral traction lugs on their outer surfaces and having inner and outer side wall, respective inwardly extending rod members detachably connected to the intermediate portions of the outer side walls, a ball element on the inner end of one of the rod members, an internally threaded sleeve member having an annular spherical ball seat at one end receiving and rotatably engaged with said ball element, an externally threaded cup member on the inner end of the other rod member threadedly engaged in said sleeve member, a spherically recessed follower member in said sleeve member receiving said ball element, a coiled spring in said sleeve member bearing between said cup member and said follower member and exerting longitudinal holding force between the internal threads of the sleeve member and the threads of said cup member, and respective additional coiled springs detachably connected to the upper and lower portions of said outer side walls and extending substantially parallel to said rod members.

References Cited in the file of this patent
UNITED STATES PATENTS

| | | |
|---|---|---|
| 1,223,546 | Williams | Apr. 24, 1917 |
| 2,273,753 | Gelinas | Feb. 17, 1942 |
| 2,946,366 | Saperstein | July 26, 1960 |